H. C. TAYLOR.
AUTOMATIC SAFETY STOP.
APPLICATION FILED FEB. 25, 1919.
1,340,305.
Patented May 18, 1920.
2 SHEETS—SHEET 1.
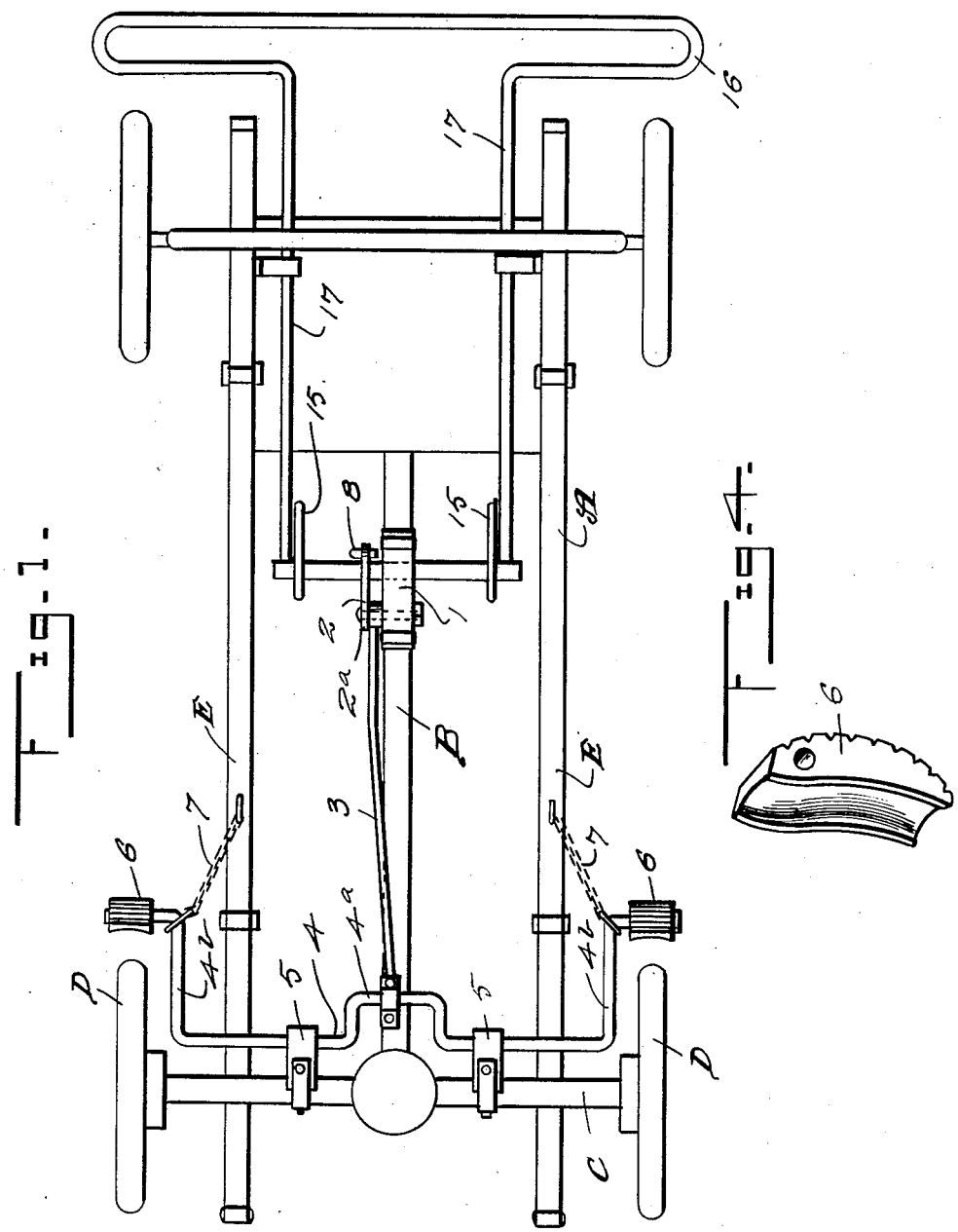
Inventor
H.C.Taylor
By

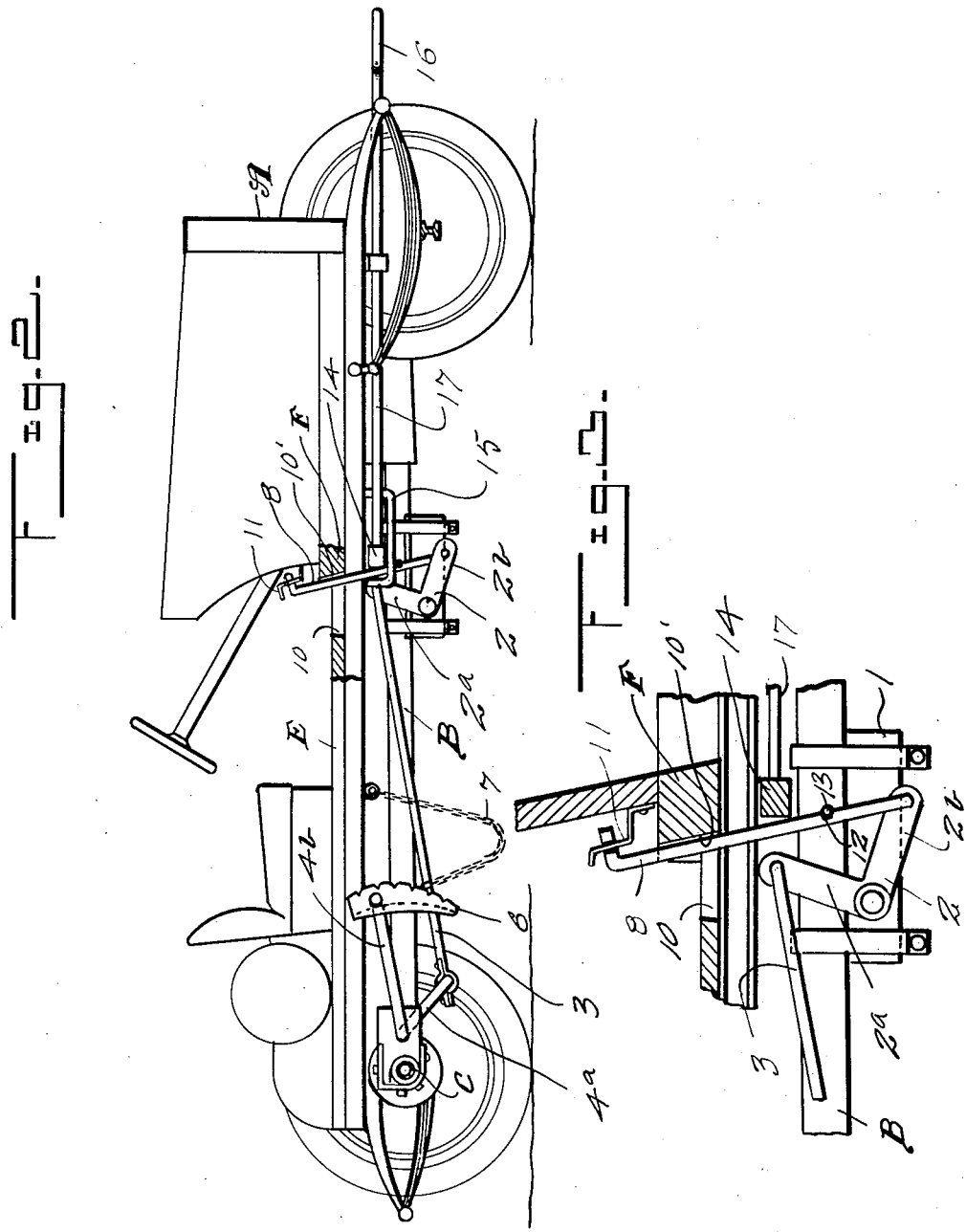

UNITED STATES PATENT OFFICE.

HARRY C. TAYLOR, OF WEST FRANKFORT, ILLINOIS.

AUTOMATIC SAFETY-STOP.

1,340,305. Specification of Letters Patent. Patented May 18, 1920.

Application filed February 25, 1919. Serial No. 279,110.

*To all whom it may concern:*

Be it known that I, HARRY C. TAYLOR, a citizen of the United States, residing at West Frankfort, in the county of Franklin and State of Illinois, have invented certain new and useful Improvements in Automatic Safety-Stops; and I do hereby declare the following to be a full, clear, and exact description of the invention, such as will enable others skilled in the art to which it appertains to make and use the same.

This invention relates to automatic safety stops, and more particularly to means for quickly stopping an automobile when an obstacle or a pedestrian is struck so as to prevent serious injury to the pedestrian or to the occupants of the vehicle.

One of the main objects of the invention is to provide a stop or braking mechanism of simple construction and operation which may be readily applied to an automobile of standard construction, this stop being operated automatically so as to be moved into operative position upon a pedestrian or an obstacle being struck by the bumping bar of the vehicle.

A further object is to provide simple and efficient means for normally holding the brake blocks in raised or inoperative position, this means also being adapted to facilitate return of the brake blocks to inoperative position after the automobile has been stopped.

Further objects will appear from the detailed description.

In the drawings:

Figure 1 is an underneath plan view of an automobile of conventional construction with the stop constructed in accordance with my invention applied.

Fig. 2 is a side view of the same with parts removed.

Fig. 3 is a detail of the setting rod and associated parts.

Fig. 4 is a perspective view of a block which is used in the stop mechanism.

The transmission shaft casing B of the automobile designated generally by A, which may be of any suitable or standard construction, is provided with a depending block 1. This block rockably supports a bell crank lever 2 which is pivotally mounted thereon at its angle for rocking movement about a horizontal axis. This lever is normally disposed with one arm vertical, the other arm of the lever being directed forwardly and horizontally disposed, as in Fig. 2. The vertical arm 2ª of bell crank 2 is connected by a rod 3 to the bight portion of a crank 4ª formed at the central portion of a transverse crank shaft 4 which is rockably mounted in supporting blocks 5 projecting forwardly from the rear axle housing C of the automobile. This shaft is provided, at each end, with a crank 4ᵇ which is disposed at an angle to crank 4ª and so related thereto that, when the shaft is in its normal position, brake blocks 6 which are pivotally mounted upon the outer ends of the cranks 4ᵇ are spaced away from the rear wheels D. When the crank shaft is released, the brake blocks 6 due to their weight serve to rock the shaft downwardly and rearwardly, the blocks fitting beneath the wheels D so as to stop or chock the same, downward and rearward movement of the blocks being positively limited by chains 7 of suitable length secured to the cranks 4ᵇ and to the bed E of the automobile A. When in this position, the blocks serve to effectually prevent rotation of the rear wheels.

A setting rod 8 is pivotally secured at its lower end to the forward end of the horizontal arm 2ᵇ of the bell crank 2, and is operable through a slot 10 provided through bed E for this purpose. This rod normally fits into a suitable recess 10 provided in the inner edge of footboard F of the automobile for this purpose and is, preferably, though not necessarily, retained in this position by a spring clip 11. The setting rod is provided a short distance above its point of connection with the bell crank lever with a horizontal groove 12 which is adapted to receive a locking pin 13 which projects from one side of the transmission shaft casing B. When the setting rod is in this position, the bell crank lever is locked in its normal position so as to hold the brake blocks raised, as illustrated. A tripping bar 14 is slidably mounted in spaced guides 15 secured to the under face of bed E, this bar being disposed transversely of the bed and normally positioned in engagement with the setting rod. A bumping bar 16 of any suitable or preferred construction is mounted at the front of the automobile and is provided with two parallel arms 17 which extend rearwardly of bed E, longitudinally thereof, the rearward ends of these arms being secured to the tripping bar 14 adjacent each end thereof.

The setting rod 8 normally limits rearward movement of bar 14 so as to hold the bumping bar 16 in its normal or operative position, this setting rod also serving to normally hold the brake blocks in raised position in the manner described. When the bumping bar 16 strikes a pedestrian or an obstacle, the tripping bar 14 is forced rearwardly thus moving the setting bar 8 rearwardly out of engagement with the pin 13. This releases the setting bar so as to permit free rocking movement of bell crank 2 which results in the brake blocks 6 being moved downwardly by gravity into operative position beneath the rear wheels of the vehicle so as to quickly stop the same in the manner described. After the vehicle has been stopped, by moving it rearwardly so as to disengage the rear wheels D from the brake blocks, these blocks may be returned to inoperative position by lowering the setting rod 8, this rod being then rocked forwardly so as to fit into recess 10 and spring clip 11, this forward rocking movement of the setting rod also serving to engage pin 13 into groove 12 and to move bumping bar 16 outwardly or forwardly into operative position.

It will be evident that there may be slight changes made in the construction and arrangement of the details of my invention without departing from the field and scope of the same, and I intend to include all such variations, as fall within the scope of the appended claim, in this application in which a preferred form only of my invention is disclosed.

What I claim is:

In a stop mechanism of the character described, the combination with an automobile of a rockably mounted crank shaft extending transversely thereof in advance of and adjacent the rear wheels of the automobile, brake blocks mounted on said shaft and positioned to be lowered beneath and in front of said rear wheels, a bell crank lever, connections between one arm of said lever and the crank shaft for rocking said shaft, a vertically movable setting rod connected to the other arm of said bell crank lever, said rod being provided with a transverse groove intermediate its ends, a setting pin positioned for engagement into said groove for normally holding the rod in lowered position, a bumping bar projecting forwardly of the automobile, and a tripping bar connected to said bumping bar so as to be forced rearwardly thereby, said tripping bar being positioned in front of and closely adjacent the setting rod so as to force the same rearwardly out of engagement with said setting pin upon rearward movement of the bumping bar so as to release the crank shaft and permit downward movement of said braking blocks into operative position, and spring means for retaining the setting rod in engagement with the pin.

In testimony whereof I affix my signature in presence of two witnesses.

HARRY C. TAYLOR.

Witnesses:
H. R. DIAL,
PEARL BEATTIE.